(12) United States Patent
Yarabolu

(10) Patent No.: US 12,632,541 B2
(45) Date of Patent: May 19, 2026

(54) SYSTEMS AND METHODS TO IMPROVE NETWORK AND DATA SECURITY BY AUTOMATICALLY PREVENTING ROGUE DATABASE QUERIES

(71) Applicant: BANK OF AMERICA CORPORATION, Charlotte, NC (US)

(72) Inventor: Vijay Kumar Yarabolu, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 39 days.

(21) Appl. No.: 18/731,805

(22) Filed: Jun. 3, 2024

(65) Prior Publication Data

US 2025/0371139 A1     Dec. 4, 2025

(51) Int. Cl.
*G06F 21/55*          (2013.01)
*G06F 16/2458*        (2019.01)

(52) U.S. Cl.
CPC ........ *G06F 21/552* (2013.01); *G06F 16/2458* (2019.01); *G06F 2221/034* (2013.01)

(58) Field of Classification Search
CPC ............... G06F 21/552; G06F 16/2458; G06F 2221/034
USPC ........................................................... 726/22
See application file for complete search history.

(56) References Cited

U.S. PATENT DOCUMENTS

| | | | |
|---|---|---|---|
| 10,043,109 | B1 | 8/2018 | Du |
| 10,152,970 | B1 | 12/2018 | Olabiyi |
| 10,642,846 | B2 | 5/2020 | Gao |
| 10,983,971 | B2 | 4/2021 | Carvalho |
| 11,017,307 | B2 | 5/2021 | Pezeshkpour |
| 11,042,710 | B2 | 6/2021 | Pezeshkpour |
| 11,062,179 | B2 | 7/2021 | Bose |
| 11,271,876 | B2 | 3/2022 | Yoon |
| 11,281,976 | B2 | 3/2022 | Dua |
| 11,455,306 | B2 | 9/2022 | Maheshwari |
| 11,455,515 | B2 | 9/2022 | Kolter |
| 11,481,416 | B2 | 10/2022 | Dua |
| 11,513,869 | B2 | 11/2022 | Goodsitt |
| 11,562,039 | B2 | 1/2023 | Renders |
| 11,682,474 | B2 | 6/2023 | Weldemariam |
| 11,861,321 | B1 | 1/2024 | O'Kelly |
| 12,079,197 | B2 * | 9/2024 | Boling ............. G06F 16/24552 |
| 2014/0236578 | A1 | 8/2014 | Malon |
| 2017/0091814 | A1 | 3/2017 | Liu |
| 2020/0019863 | A1 | 1/2020 | Dua |
| 2020/0364083 | A1 * | 11/2020 | Walby ................... G06F 9/5072 |
| 2021/0248376 | A1 | 8/2021 | Zhao |

(Continued)

*Primary Examiner* — Anthony D Brown

(74) *Attorney, Agent, or Firm* — Moore & Van Allen PLLC; Lauren M. Stokes

(57)          ABSTRACT

Systems, computer program products, and methods are described herein for improving network and data security by automatically preventing rogue database queries. The present disclosure is configured to identify a query request, wherein the query request comprises query request metadata; apply the query request to a generative adversarial network (GAN) model, wherein the GAN model is protected by a security gateway; generate, by the GAN model, a result metadata based on the query request, wherein the GAN model is trained on a database schema; and determine, based on a comparison of the query request metadata and the result metadata, whether to allow the query request by the security gateway.

18 Claims, 7 Drawing Sheets

(56) References Cited

U.S. PATENT DOCUMENTS

| 2022/0414430 A1* | 12/2022 | Li | .......................... G06N 3/08 |
| 2024/0046108 A1 | 2/2024 | Ma | |

* cited by examiner

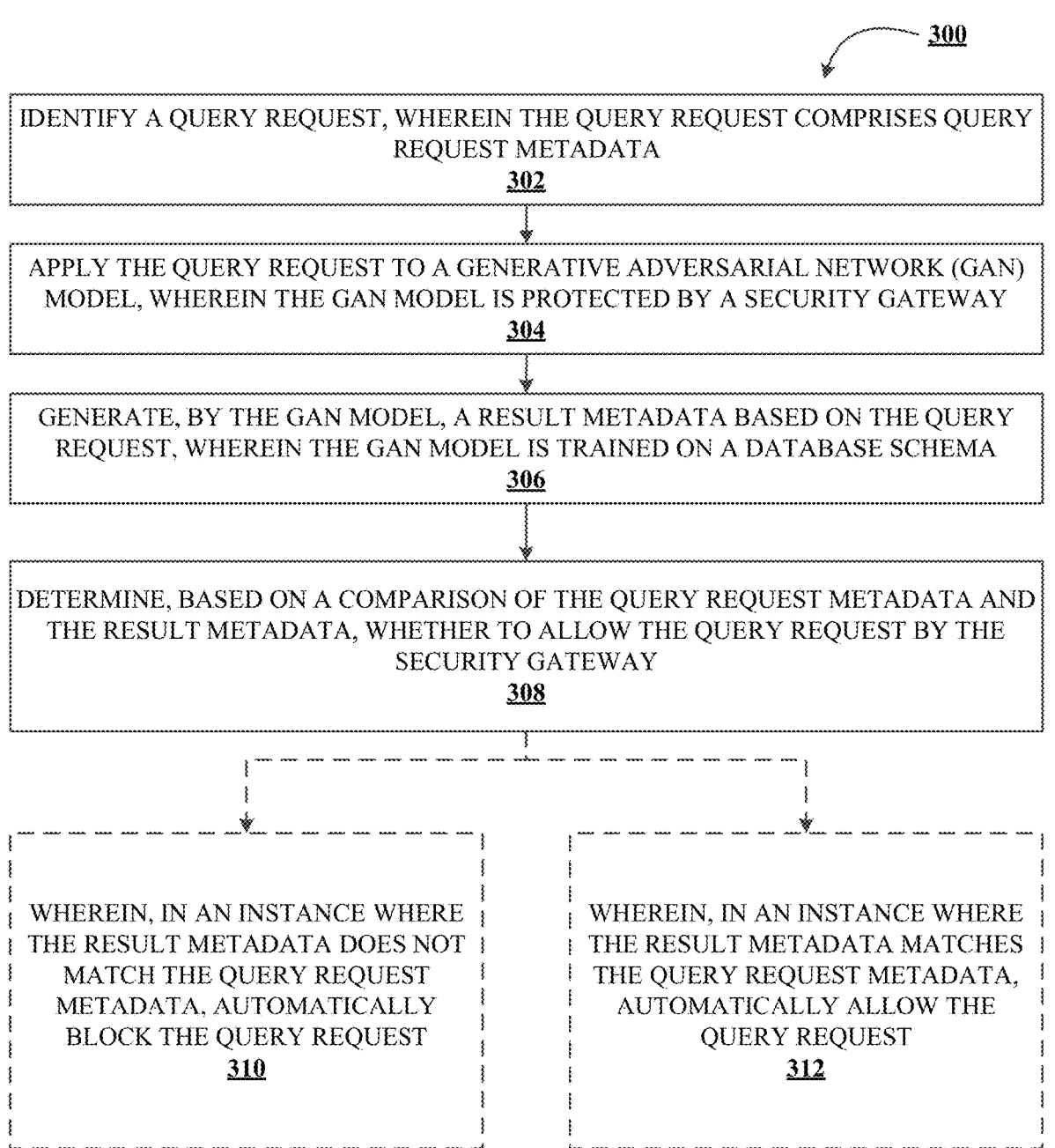

300

IDENTIFY A QUERY REQUEST, WHEREIN THE QUERY REQUEST COMPRISES QUERY REQUEST METADATA
302

APPLY THE QUERY REQUEST TO A GENERATIVE ADVERSARIAL NETWORK (GAN) MODEL, WHEREIN THE GAN MODEL IS PROTECTED BY A SECURITY GATEWAY
304

GENERATE, BY THE GAN MODEL, A RESULT METADATA BASED ON THE QUERY REQUEST, WHEREIN THE GAN MODEL IS TRAINED ON A DATABASE SCHEMA
306

DETERMINE, BASED ON A COMPARISON OF THE QUERY REQUEST METADATA AND THE RESULT METADATA, WHETHER TO ALLOW THE QUERY REQUEST BY THE SECURITY GATEWAY
308

WHEREIN, IN AN INSTANCE WHERE THE RESULT METADATA DOES NOT MATCH THE QUERY REQUEST METADATA, AUTOMATICALLY BLOCK THE QUERY REQUEST
310

WHEREIN, IN AN INSTANCE WHERE THE RESULT METADATA MATCHES THE QUERY REQUEST METADATA, AUTOMATICALLY ALLOW THE QUERY REQUEST
312

SYSTEMS AND METHODS TO IMPROVE NETWORK AND DATA SECURITY BY AUTOMATICALLY PREVENTING ROGUE DATABASE QUERIES

TECHNOLOGICAL FIELD

Example embodiments of the present disclosure relate to improve network and data security by automatically preventing rogue database queries.

BACKGROUND

In data and network security, rogue queries from malicious actors and hackers often occur, especially those malicious actors that are hoping to access databases with fake or false queries in order to gather sensitive data. These rogue queries pose significant threats to system integrity, security, and performance. Such rogue queries may include but are not limited to SQL injection attacks where hackers inject harmful code into user inputs and NoSQL injection targeting non-relational databases. Further, these queries may originate from external and internal sources to the network storing the intended database, whereby such internal sources may include but are not limited to in-house threats such as database engineers and other such employees with access privileges. By allowing access to the database information through these rogue queries, data leakage of sensitive data or even denial of service incidents may occur. Thus, there exists a need for a system that can improve network and data security by automatically preventing rogue database queries without causing an undue burden on those that submit non-rogue or proper access queries and should be trusted.

Applicant has identified a number of deficiencies and problems associated with preventing rogue database queries. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for improving network and data security by automatically preventing rogue database queries.

In one aspect, a system for improving network and data security by automatically preventing rogue database queries is provided. In some embodiments, the system may comprise: a processing device; a non-transitory storage device containing instructions when executed by the processing device, causes the processing device to perform the steps of: identify a query request, wherein the query request comprises query request metadata; apply the query request to a generative adversarial network (GAN) model, wherein the GAN model is protected by a security gateway; generate, by the GAN model, a result metadata based on the query request, wherein the GAN model is trained on a database schema; and determine, based on a comparison of the query request metadata and the result metadata, whether to allow the query request by the security gateway, wherein, in an instance where the result metadata does not match the query request metadata, automatically block the query request, or wherein, in an instance where the result metadata matches the query request metadata, automatically allow the query request.

In some embodiments, the GAN model is pre-trained on at least one of a results cache database or an historical query pattern database.

In some embodiments, the query request metadata is generated based on an intelligent instrumented bot. In some embodiments, the intelligent instrumented bot is applied on a computing system for at least one of an external client or an internal client to the network associated with the database schema.

In some embodiments, the security gateway protects the GAN model from an internal client or an external client that generates the query request.

In some embodiments, the query request data comprises a purpose, a potential quantity of results, a data and time metadata, a source identifier, or a possible processing time.

In some embodiments, the GAN model generates the result metadata by simulating an output of the query request without executing the query request.

In some embodiments, the matching of the query request metadata and the result metadata comprises a matching of a range for a potential quantity of results and the result metadata.

In some embodiments, the matching of the query request metadata and the result metadata comprises a matching of a range for a possible processing time the result metadata.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
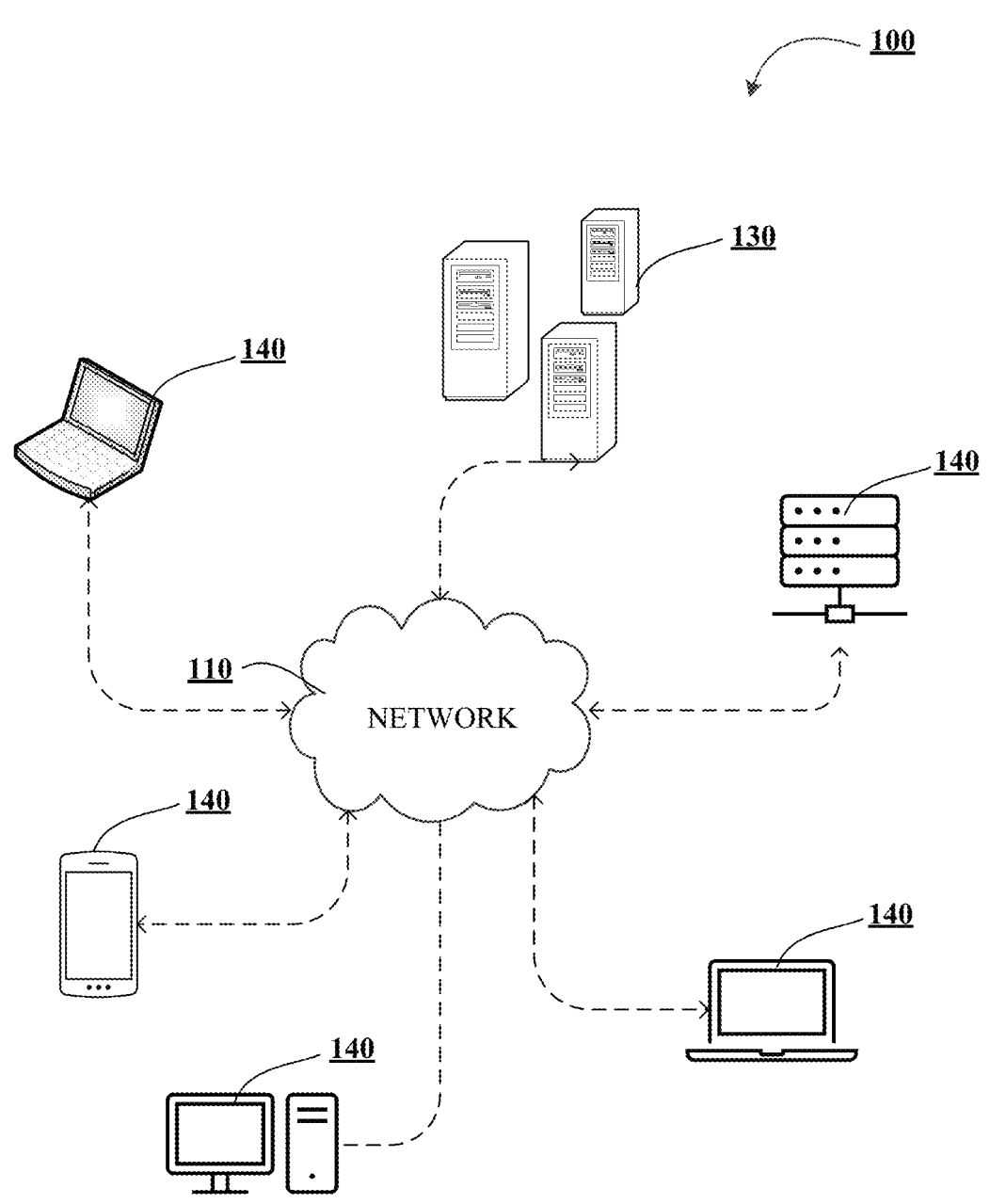
Figure 1B:
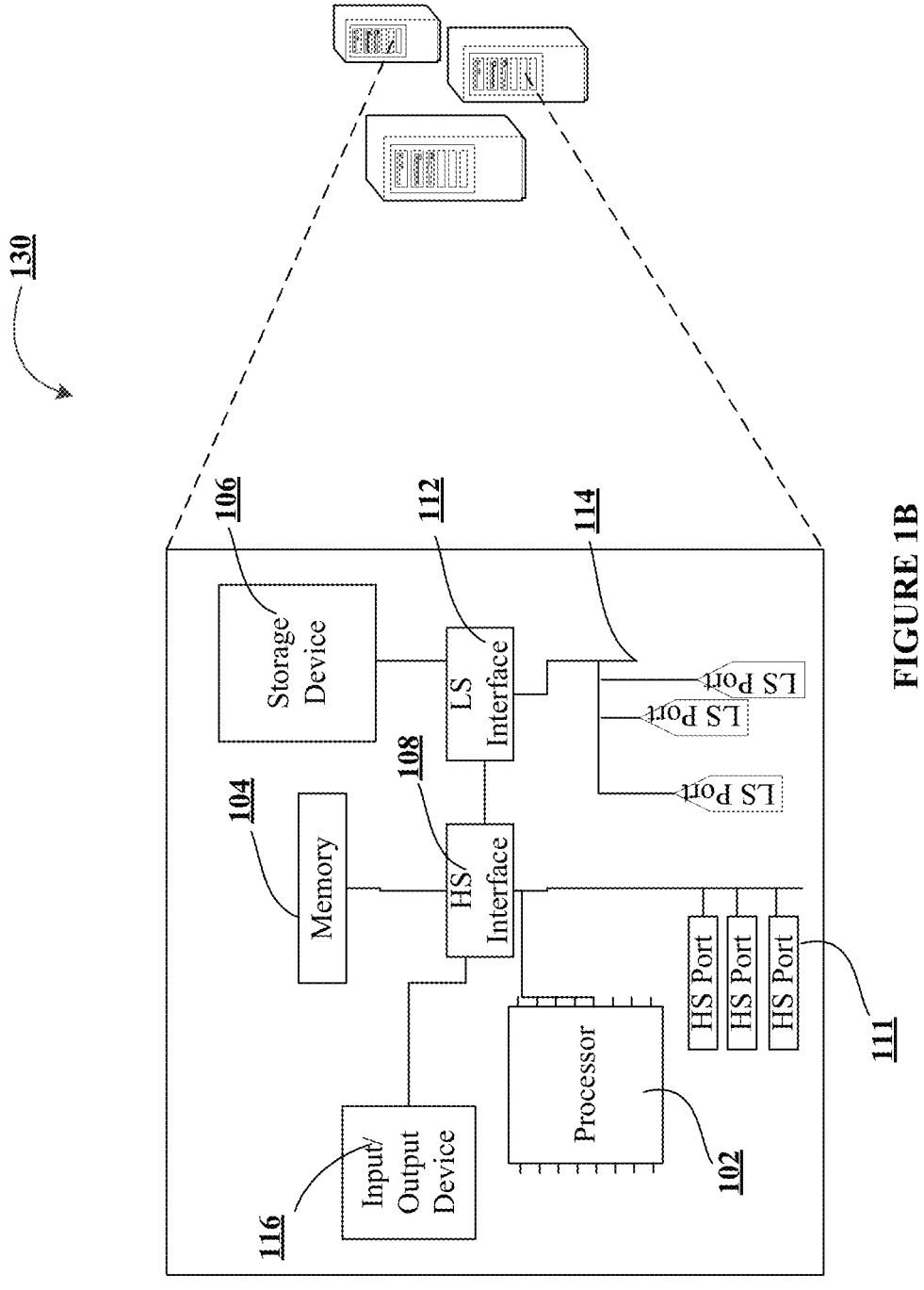
Figure 1C:
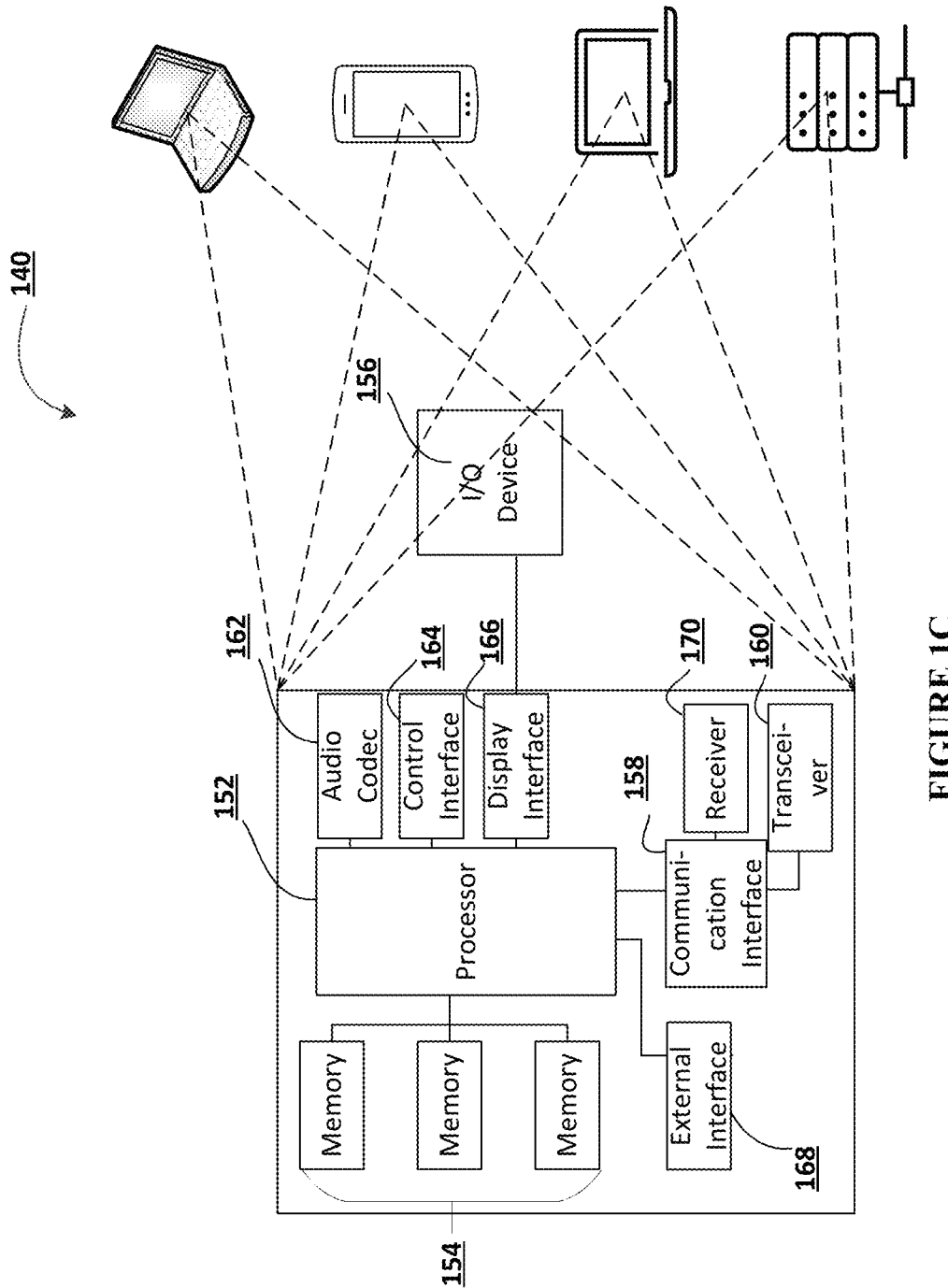
Figure 2:
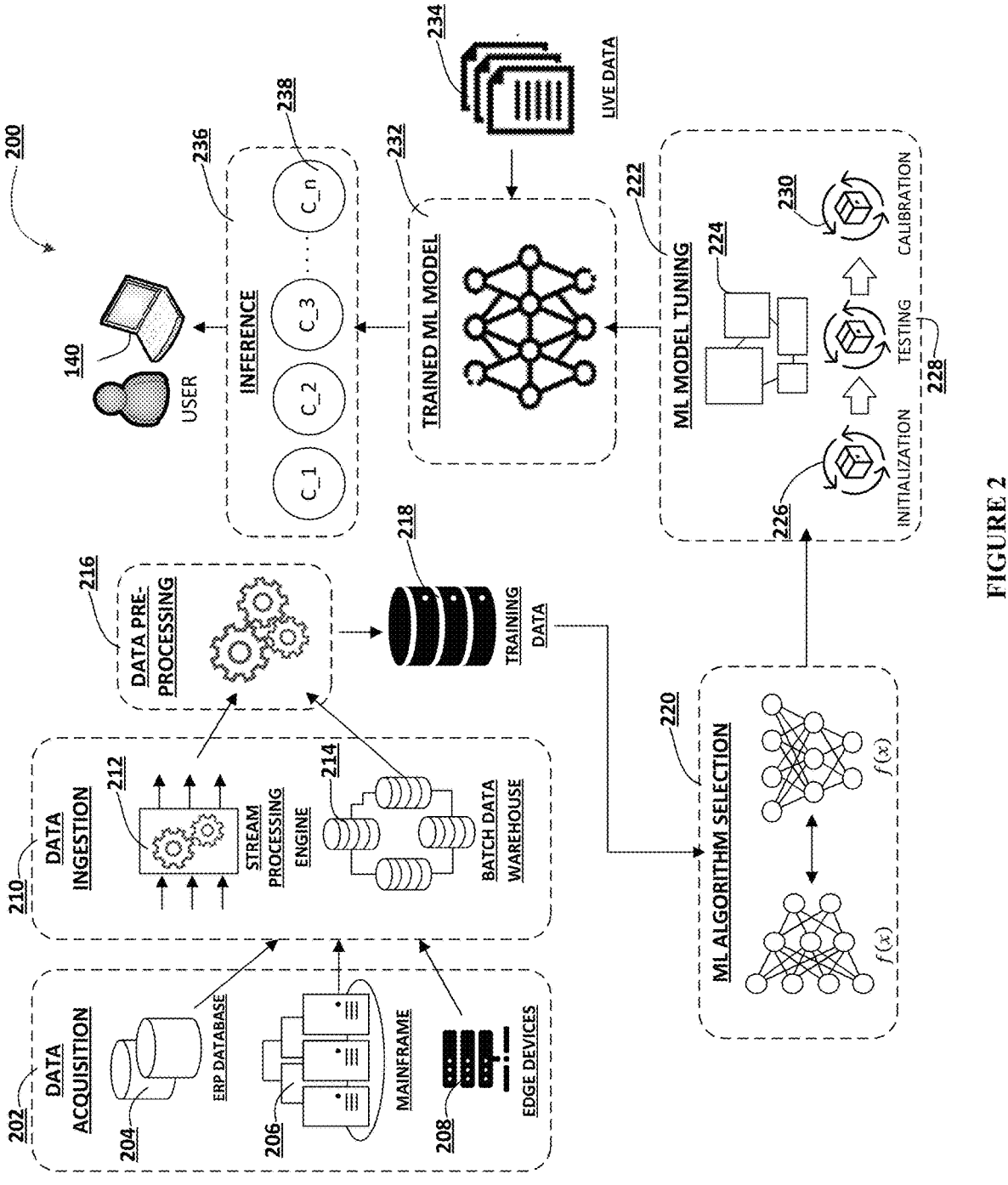
Figure 4:
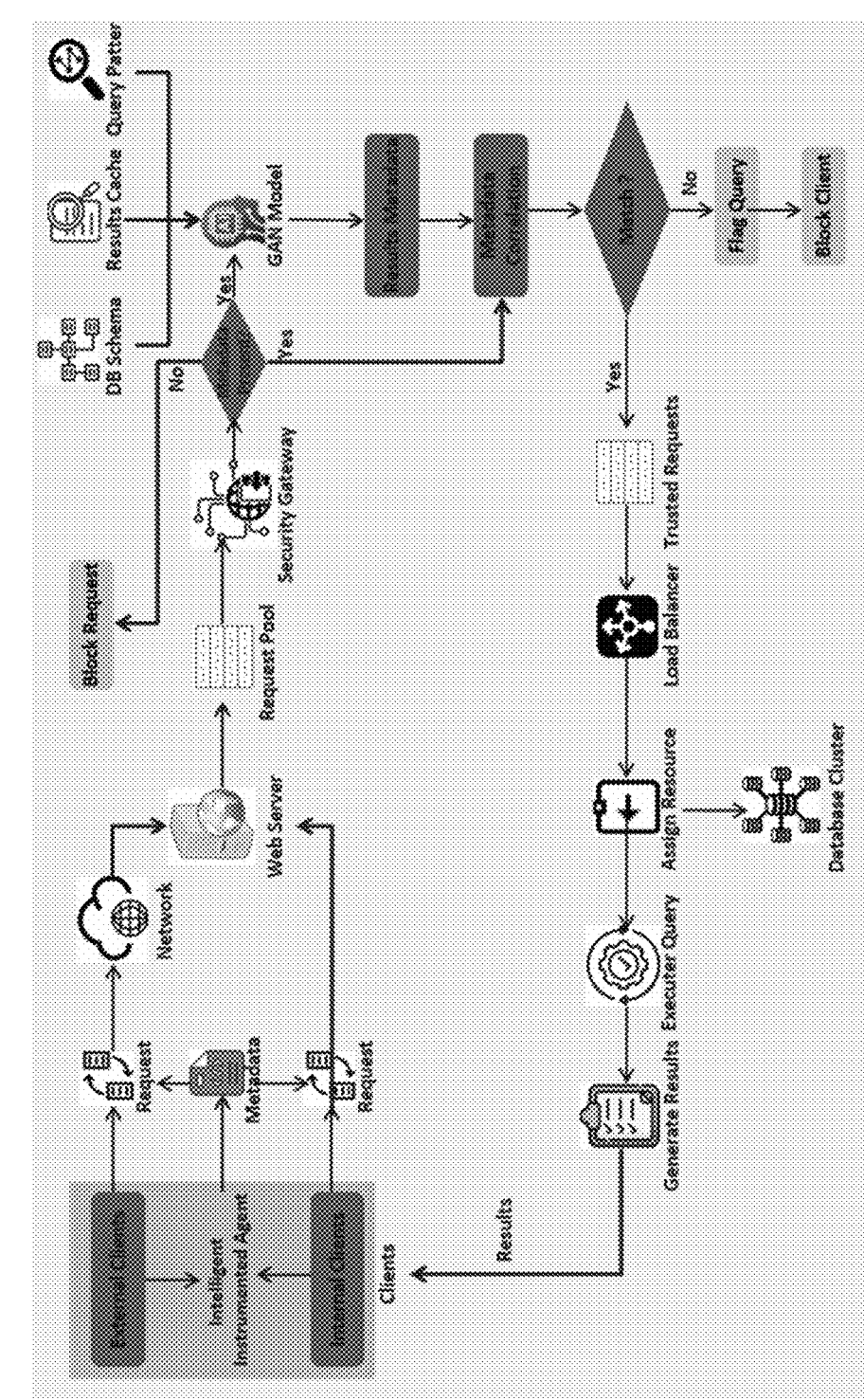
Figure 5:
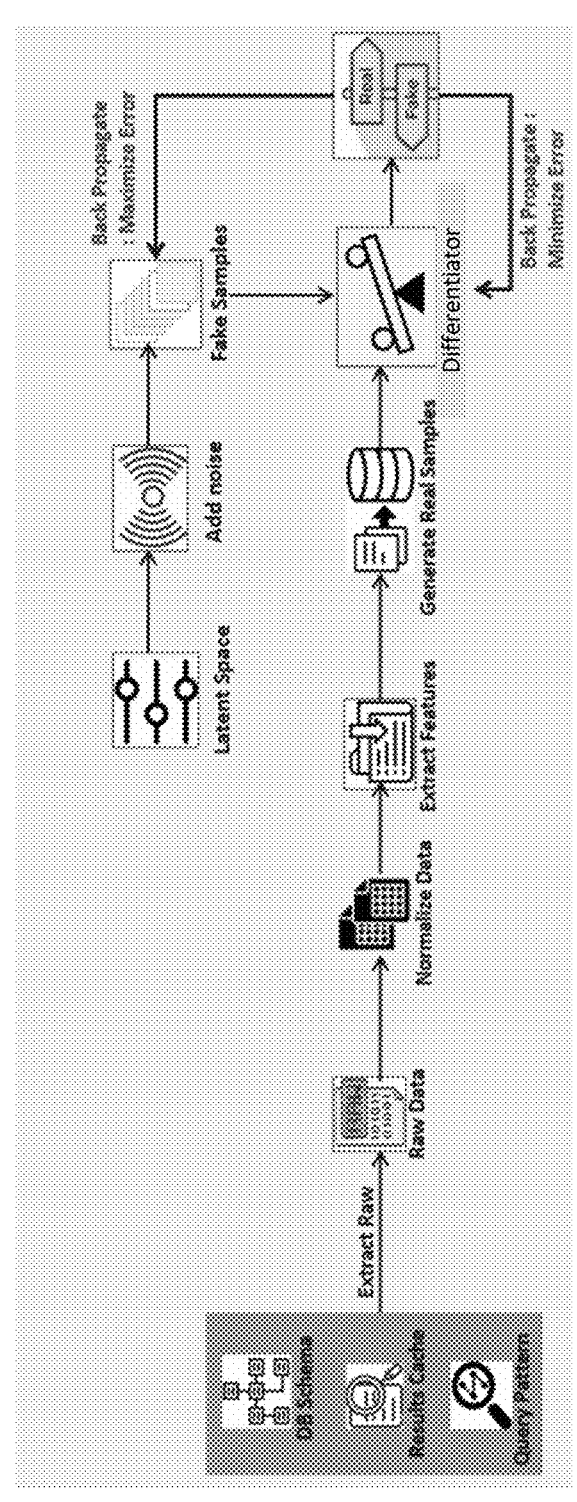

FIGS. 1A-1C illustrates technical components of an exemplary distributed computing environment for improving network and data security by automatically preventing rogue database queries, in accordance with an embodiment of the disclosure;

FIG. 2 illustrates an exemplary machine learning (ML) subsystem architecture, in accordance with an embodiment of the disclosure;

FIG. 3 illustrates a process flow for improving network and data security by automatically preventing rogue database queries, in accordance with an embodiment of the disclosure;

FIG. 4 illustrates an exemplary technical flow for improving network and data security by automatically preventing rogue database queries, in accordance with an embodiment of the disclosure; and FIG. 5 illustrates an exemplary technical flow for training the generative adversarial network (GAN) model, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In data and network security, rogue queries from malicious actors and hackers often occur, especially those malicious actors that are hoping to access databases with fake or false queries in order to gather sensitive data. These rogue queries pose significant threats to system integrity, security, and performance. Such rogue queries may include but are not limited to SQL injection attacks where hackers inject harmful code into user inputs and NoSQL injection targeting non-relational databases. Further, these queries may originate from external and internal sources to the network storing the intended database, whereby such internal sources may include but are not limited to in-house threats such as database engineers and other such employees with access privileges. By allowing access to the database information through these rogue queries, data leakage of sensitive data or even denial of service incidents may occur. Thus, there exists a need for a system that can improve network and data security by automatically preventing rogue database queries without causing an undue burden on those that submit non-rogue or proper access queries and should be trusted.

Accordingly, the present disclosure provides for the identification of a query request, wherein the query request comprises query request metadata; the application of the query request to a generative adversarial network (GAN) model, wherein the GAN model is protected by a security gateway; and the generation, by the GAN model, of a result metadata based on the query request, wherein the GAN model is trained on a database schema. Further, the disclosure provides for the determination, based on a comparison of the query request metadata and the result metadata, of whether to allow the query request by the security gateway, wherein, in an instance where the result metadata does not match the query request metadata, automatically block the query request, or wherein, in an instance where the result metadata matches the query request metadata, automatically allow the query request.

In other words, the disclosure provides a system for preventing rogue queries within a network environment by using generative adversarial network (GAN) models to test whether metadata between the query matches the expected metadata of the result. The disclosure trains a GAN model with the database schema, cached results, and historical query patterns; builds an intelligent instrumented bot that can generate the queries from both an internal and an external client; and then determines whether the metadata expected by the intelligent instrumented bot for the expected result of the query matches the actual output metadata if the query was executed at the database. However, and importantly, the database query is not actually executed to make this determination and instead a security gateway is placed between the database and the GAN model, and the internal or external client that generates the query, and will only allow access upon comparing the metadata of the request and the metadata generated by the GAN model (e.g., the actual expected output data of the database if the query was executed) and determining that the metadata matches. In an instance where the metadata does not match, then the system automatically flags the query and blocks the internal or external client that generated the query.

What is more, the present disclosure provides a technical solution to a technical problem. As described herein, the technical problem includes preventing rogue database queries. The technical solution presented herein allows for the automatic detection and prevention of rogue database queries without the need for executing any database queries. In particular, the disclosure is an improvement over existing solutions to the prevention of rogue database queries, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for improving network and data security by automatically preventing rogue database queries 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources

204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor.

Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc., unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyper-parameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relation-ships and patterns between variables in a dataset based on the input, or training data 218. A fully trained machine learning model 232 is one whose hyperparameters are tuned and model accuracy maximized.

The trained machine learning model 232, similar to any other software application output, can be persisted to stor-age, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using super-vised learning algorithms may be used to structure compu-tations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These catego-rized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for improving network and data security by automatically preventing rogue database queries, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300.

As shown in block 302, the process flow 300 may include the step of identifying a query request, wherein the query request comprises query request metadata. For example, the system may identify at least one query request which was generated within the network associated with an intended database for searching or outside the network associated with the intended database for searching (e.g., the query request may be generated from an internal client or an external client, respectively). Such a query request may comprise data needed for identifying the particular data intended to be received from a database, such as a user identifier associated with the data, a purpose identifier for the type of data (e.g., "retrieve user email"), a source identifier of where the data is stored and will be found, and/or the like. Further, and as used herein, the query request metadata may comprise each of the data identified above (purpose identifier, source identifier, and/or the like), but may also comprise a possible quantity identifier which identifiers the potential quantity of results that are expected from the query request, a date and time for the generation of the requested data, the potential time for processing the query request, and/or the like. Thus, and in such embodi-ments, the query request data comprises a purpose, a poten-tial quantity of results, a data and time metadata, a source identifier, or a possible processing time.

In this manner, the query request metadata may be used by the system described herein to generate a guideline for data intended to be received by the query request, such that the system may use the guideline as a benchmark to determine whether to allow the query request to be applied to the database (e.g., when the benchmark matches the actual data if the query request were carried out, then the query request may be applied to the database).

In some embodiments, the query request metadata is generated based on an intelligent instrumented bot. For example, the system may further comprise an intelligent instrumented bot which is configured to generate the query request and its query request metadata based on assessing the client's need (e.g., the external or internal client and the task or reason for needing to access a database). In some embodiments, the intelligent instrumented bot may be trained on historical query requests generated by the client at the client's device, historical data received based on the historical query requests, historical tasks and intentions of the client and the associated historical query requests gen-erated, and/or the like. Based on this training of the intelli-gent instrumented bot, the intelligent instrumented bot may generate the query request and query request metadata based on the current intention or task of the client/user. In some such embodiments, the intelligent instrumented bot may refer to an artificial intelligence engine, a machine learning model, and/or the like, which is trained and configured to determine client intentions for accessing a database and generate a proper or appropriate query request with query request metadata to access the correct database.

Additionally, and in some embodiments, the intelligent instrumented bot is applied on a computing system for at least one of an external client or an internal client to the network associated with the database schema. Thus, and in such embodiments, the intelligent instrumented bot may comprise an application on a client's device, a plug-in on a client's device, and/or the like. In each embodiment, the intelligent instrumented bot is allowed access to the client's underlying data and historical data to train itself for future generation of query requests and associated query request metadata.

As shown in block 304, the process flow 300 may include the step of applying the query request to a generative adversarial network (GAN) model, wherein the GAN model is protected by a security gateway. For example, the system may generate and train a GAN model to generate a result metadata from the database schema that is associated with the query request, without actually executing the query request in the database to receive the results. Instead, the GAN model is pre-trained to predict the results of the query request and based on such results, generate result metadata which may be compared against the query request metadata (e.g., the guideline or the benchmark for determining whether to allow the execution of the query request). Further, and for protection between the query request and the GAN model, the GAN model may be protected by a security gateway which is configured to block the query request from being applied to the GAN model and the intended database. Thus, and in such embodiments, the security gateway protects the GAN model from an internal client or an external client that generates the query request.

In some embodiments, the GAN model is pre-trained on at least one of a results cache database or an historical query pattern database. In addition to the database schema, the GAN model may additionally be trained on a results cache dataset(s) or database, and/or a historical query pattern dataset(s) or database, such that each piece of data is used for further refining the results of the GAN model for accuracy and efficiency (e.g., by training on more data, the GAN model is further refined to make more accurate determinations). As used herein, the database schema refers the organization of data and storage of data within at least one database, including but not limited to relationships between the storage of data, titles of data organizations (such as table names, fields, data types, and/or the like), which may be used by the GAN model to determine where to access each piece of data from each query request (e.g., a source identifier(s)), the number of results for each instance of data within the database schema, and/or the like. Additionally, and as used herein, the results cache dataset(s) or database refers to a cache or listing of historical results for the data of the database(s) within the network (e.g., such as the database schema described above), including but not limited to the number of results, the time to search and collect the results, the date and time of generation for the data associated with the results, and/or the like. Additionally, and as used herein, the historical query pattern dataset(s) or database refers to historical queries and their patterns as compared to the results generated from the database(s) searched and collected from. In some embodiments, the historical query pattern dataset(s) may further comprise the task or intent behind the historical query pattern(s), which may be used for training the GAN model for further refinement and determination of future query responses and their associated tasks or intent.

As shown in block 306, the process flow 300 may include the step of generating, by the GAN model, a result metadata based on the query request, wherein the GAN model is trained on a database schema. For example, the system may generate—using the GAN model—a result metadata which comprises the similar or the same types of data as the query request metadata (e.g., a purpose, a potential quantity of results, a data and time metadata, a source identifier, or a possible processing time), but with the actual results of each data type if the query request were carried out and applied to the database. By way of non-limiting example, a query request metadata may comprise the following data:

Purpose: 'retrieve user email'
Potential Quantity: '1-5'
dateTime: '26-01-2024'
source: '145.34.65.75'
possible TimetoProcess: '1 ms'
and the result metadata from the GAN model may comprise:
Purpose: 'retrieve user email'
Quantity: '3'
dateTime: '26-01-2024'
source: '145.34.65.75'
possible TimetoProcess: '1 ms'

16 where—and as shown above—each of the data for each data type in the query request metadata matches the result metadata.

Thus, the result metadata may be generated by the GAN model by simulating an output of the query request without executing the query request, instead of actually executing the query request. Such a simulation allows for improved security within the network and the data of the database by not allowing potentially rogue query requests to access the database.

As shown in block 308, the process flow 300 may include the step of determining, based on the comparison of the query request metadata and the result metadata, whether to allow the query request by the security gateway. For instance, the system may determine—by comparing—the query request metadata and the result metadata to determine whether the query request can be trusted and allowed to execute within the network to access the intended database(s). As used herein, the term comparison, comparing, compare, and/or the like, refers to determining the differences between the query request metadata and the result metadata, whereby the greater the differences present, the less the query request metadata and the result metadata match. Additionally, and as used herein, the term match refers to an exact matching between the metadata, a matching of a range to an explicit or defined value within the range (e.g., where the potential quantity of the query request metadata is 1-5, and the result metadata comprises a 3 for the quantity, then a match has occurred), and/or the like. In other words, the matching of the query request metadata and the result metadata comprises a matching of a range for a potential quantity of results and the result metadata. Similarly, and in some embodiments, the matching of the query request metadata and the result metadata comprises a matching of a range for a possible processing time the result metadata.

In some embodiments, the matching of the query request metadata and the result metadata comprises a difference percentage, and wherein the difference percentage is compared to a threshold of difference and in an instance where the difference percentage meets or exceeds the threshold of difference, allow the query request. Thus, and in some embodiments, the overall data from the query request metadata and the overall data of the result metadata may each be quantified (such as where each data type is of equal weight and used to generate an overall value), and each overall quantity for the query request metadata and the overall data may be compared to generate a difference percentage. In some such embodiments, the difference percentage may be based on determining the perfect query response metadata based on the result metadata (e.g., where 5 out of 5 metadata types are correct, the overall value would be 5) and determining which metadata is missing or wrong within the query response metadata (e.g., where the possible quantity is incorrect, but the other metadata types are correct as compared to the result metadata, then the overall value for the query response request is 4 out 5, or an 80%). In some embodiments, the difference percentage generated may be compared to a threshold of difference which may be predetermined by the system itself, by a manager of the system, by a client of the system, and/or the like. In some such embodiments, and where the difference percentage is less than the threshold of difference, then the system may automatically block the query request. In some such embodiment, and where the difference percentage meets or exceeds the threshold of difference, then the system may automatically allow the query request.

In some embodiments, and as shown in block 310, the process flow 300 may include the step of automatically blocking the query request, in an instance where the result metadata does not match the query request metadata. For example, and in some embodiments, the system may automatically block the query request, block the client that generated the query request, block the client device that generated the query request, and/or the like. Additionally, and in some embodiments, the system may additionally flag the query request as untrustworthy and use such data for further training the GAN model and/or feed the query request data (e.g., client identifier, client device identifier, and/or the like) to the security gateway for automatic blocking at any future instances where the client tries to submit future query requests.

In some embodiments, and as shown in block 312, the process flow 300 may include the step of automatically allowing the query request, in an instance where the result metadata matches the query request metadata. For example, and in some embodiments, the system may allow the trustworthy query request, apply the allowed query request(s) to a load balancer which may further be configured to ensure that the network components are used equally and not overburdened with each query request, assign the correct database resource based on the query request, and execute the query request to generate the results. Such results may then be automatically transmitted back to the client's user device.

FIG. 4 illustrates an exemplary technical flow 400 for improving network and data security by automatically preventing rogue database queries, in accordance with an embodiment of the disclosure. In some embodiments, a system (e.g., similar to one or more of the systems described herein with respect to FIGS. 1A-1C) may perform one or more of the steps of technical flow 400. For example, a system (e.g., the system 130 described herein with respect to FIG. 1A-1C) may perform the steps of technical flow 400.

As shown in technical flow 500, the processes described herein may begin by generating a query request from an external or internal client, whereby the query request and its query request metadata may be generated and/or filled in by an intelligent instrumented bot. Once the query request and its query request metadata is generated, the query request may be transmitted to a web server (either directly or via a network), and added to a request pool. Such a request pool may be generated and updated as the query requests are received by the web server, such that the request pool is organized based on timestamps of when each query request is received and sequentially based on the same. Such a request pool may then be applied to the security gateway, which may act as a blocker between the query requests not yet identified as trustworthy and the GAN model/associated database(s). In some embodiments, and where the metadata is not present at all in the database(s) of the network (e.g., where the source identifier is incorrect, where the user identifier does not exist, and/or the like), then the query request may automatically be blocked.

In some embodiments, and where the metadata is present, then the process may continue to the GAN model (which has been trained on the database schema, the results cache database(s), the historical query pattern(s), and/or the like) which is configured to generate results metadata based on the query request, without executing the query request. Once the results metadata have been generated, the system may determine whether the query request metadata and the result metadata match. Where the query request metadata and the result metadata do match, then the system may allow the query request and flag the query request as trustworthy. In the instance where the query request metadata and the result metadata do not match, then the query request may automatically be flagged, blocked, and the generated client and client device may additionally be blocked.

Additionally, and in some instances, other exemplary scenarios may occur beyond the examples provided herein. For example and where the query request is generated from an internal client device (internal to the network comprising the database(s)), and where the query request comprises a request to collect bulk data, the processes described herein may create query request metadata from the tasks associated with the user of the client device (such as task based on tickets or issue statements the user is working on), then the query request metadata may additionally be validated against the result metadata of the GAN model. Such a query request may be validated before actually executing the query request and allow for any potential data loss or overburdening on database retrievals.

Similarly, and in some scenarios where an internal client attempts to fetch sensitive data, then the disclosure provided herein may generate—using the intelligent instrumented bot—query request metadata based on production issues or tickets assigned to the client user, and the query request metadata may be validated against the GAN model's result metadata. In some such embodiments, and where the requested data is sensitive data, the system may require an exact matching (and not a threshold matching using the difference percentage and/or the threshold of difference) to allow or block the query request.

FIG. 5 illustrates an exemplary technical flow 500 for training the generative adversarial network (GAN) model, in accordance with an embodiment of the disclosure. In some embodiments, a system (e.g., similar to one or more of the systems described herein with respect to FIGS. 1A-1C) may perform one or more of the steps of technical flow 500. For example, a system (e.g., the system 130 described herein with respect to FIG. 1A-1C) may perform the steps of technical flow 500.

As shown in technical flow 500, the system may train the GAN model based on at least a collection of the database schema(s), results cache dataset(s) or database(s), and/or historical query pattern dataset(s) or database(s). Upon collecting such data, the raw data of each may be extracted and normalized. Upon normalizing the data, features from each dataset may be extracted and used to generate real samples (e.g., real samples of data that are actually valid and real). As used herein, the GAN model may be based on a machine learning model subsystem (like that shown and described with respect to FIG. 2), which trains two neural networks to compete against each other in order to generate authentic data based on a training dataset comprising real data. As one of the neural networks generates new data based on modifying real sample data, the other neural network will attempt to predict the real from the fake/generated data. Such training via these competing neural networks may occur regularly until the predicting neural network (i.e., the neural network that attempts to determine the fake data from the real data) cannot distinguish the data anymore. Thus, and as shown in FIG. 5, the differentiator component (e.g., the predicting neural network) may determine which data is fake and which data is real, and may back-propagate or input feedback until the error is minimized (e.g., the data cannot be differentiated). Upon training the GAN model, the noise may be added as an input to the GAN model to transform it to meaningful data across a wide variety of input data (such as by sampling from multiple sources. Similarly, latent space may be additionally added to the GAN model for training the GAN model to comprise compressed representations of historical input and output data of the GAN model. In this manner, the input data and the output data of the GAN model may continuously be stored and compressed for future iterations.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for improving network and data security by automatically preventing rogue database queries, the system comprising:

a processing device;

a non-transitory storage device containing instructions when executed by the processing device, causes the processing device to perform the steps of:

identify a query request, wherein the query request comprises query request metadata, wherein the query request metadata comprises a potential quantity of results and a potential processing time of results;

apply the query request to a generative adversarial network (GAN) model, wherein the GAN model is protected by a security gateway;

generate, by the GAN model, a result metadata based on the query request, wherein the GAN model is trained on a database schema, wherein the result metadata comprises simulated quantity of results and simulated time of results; and determine, based on a comparison of the query request metadata and the result metadata, whether to allow the query request by the security gateway, wherein, in an instance where the potential quantity of results does not match the simulated quantity of results or the potential processing time of results does not match the simulated time of results, automatically block the query request, or wherein, in an instance where the potential quantity of results matches the simulated quantity of results and the potential processing time of results matches the simulated time of results, automatically allow the query request.

2. The system of claim 1, wherein the GAN model is pre-trained on at least one of a results cache database or an historical query pattern database.

3. The system of claim 1, wherein the query request metadata is generated based on an intelligent instrumented bot.

4. The system of claim 3, wherein the intelligent instrumented bot is applied on a computing system for at least one of an external client or an internal client to the network associated with the database schema.

5. The system of claim 1, wherein the security gateway protects the GAN model from an internal client or an external client that generates the query request.

6. The system of claim 1, wherein the query request data comprises a purpose, a potential quantity of results, a data and time metadata, a source identifier, or the potential processing time.

7. The system of claim 1, wherein the GAN model generates the result metadata by simulating an output of the query request without executing the query request.

8. The system of claim 1, wherein the matching of the query request metadata and the result metadata comprises a difference percentage, and wherein the difference percentage is compared to a threshold of difference and in an instance where the difference percentage meets or exceeds the threshold of difference, allow the query request.

9. A computer program product for improving network and data security by automatically preventing rogue database queries, the computer program product comprising a non-transitory computer-readable medium comprising code causing an apparatus to:

identify a query request, wherein the query request comprises query request metadata, wherein the query request metadata comprises a potential quantity of results and a potential processing time of results;

apply the query request to a generative adversarial network (GAN) model, wherein the GAN model is protected by a security gateway;

generate, by the GAN model, a result metadata based on the query request, wherein the GAN model is trained on a database schema, wherein the result metadata comprises simulated quantity of results and simulated time of results; and determine, based on a comparison of the query request metadata and the result metadata, whether to allow the query request by the security gateway, wherein, in an instance where the potential quantity of results does not match the simulated quantity of results or the potential processing time of results does not match the simulated time of results, automatically block the query request, or wherein, in an instance where the potential quantity of results matches the simulated quantity of results and the potential processing time of results matches the simulated time of results the result, automatically allow the query request.

10. The computer program product of claim 9, wherein the GAN model is pre-trained on at least one of a results cache database or an historical query pattern database.

11. The computer program product of claim 9, wherein the query request metadata is generated based on an intelligent instrumented bot.

12. The computer program product of claim 9, wherein the security gateway protects the GAN model from an internal client or an external client that generates the query request.

13. The computer program product of claim 9, wherein the query request data comprises a purpose, a potential quantity of results, a data and time metadata, a source identifier, or the potential processing time.

14. A computer implemented method for improving network and data security by automatically preventing rogue database queries, the computer implemented method comprising:

identifying a query request, wherein the query request comprises query request metadata, wherein the query request metadata comprises a potential quantity of results and a potential processing time of results;

applying the query request to a generative adversarial network (GAN) model, wherein the GAN model is protected by a security gateway;

generating, by the GAN model, a result metadata based on the query request, wherein the GAN model is trained on a database schema, wherein the result metadata comprises simulated quantity of results and simulated time of results; and determining, based on a comparison of the query request metadata and the result metadata, whether to allow the query request by the security gateway, wherein, in an instance where the potential quantity of results does not match the simulated quantity of results or the potential processing time of results does not match the simulated time of results, automatically blocking the query request, or wherein, in an instance where the potential quantity of results matches the simulated quantity of results and the potential processing time of results matches the simulated time of results, automatically allowing the query request.

15. The computer implemented method of claim 14, wherein the GAN model is pre-trained on at least one of a results cache database or an historical query pattern database.

16. The computer implemented method of claim 14, wherein the query request metadata is generated based on an intelligent instrumented bot.

17. The computer implemented method of claim 14, wherein the security gateway protects the GAN model from an internal client or an external client that generates the query request.

18. The computer implemented method of claim 14, wherein the query request data comprises a purpose, a potential quantity of results, a data and time metadata, a source identifier, or the potential processing time.

\* \* \* \* \*